US012241386B2

(12) United States Patent
Kray et al.

(10) Patent No.: US 12,241,386 B2
(45) Date of Patent: Mar. 4, 2025

(54) TURBINE ENGINE AIRFOIL WITH A WOVEN CORE AND WOVEN LAYER

(71) Applicant: GENERAL ELECTRIC COMPANY, Schenectady, NY (US)

(72) Inventors: Nicholas Joseph Kray, Mason, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 16 days.

(21) Appl. No.: 18/171,938

(22) Filed: Feb. 21, 2023

(65) Prior Publication Data

US 2024/0280027 A1 Aug. 22, 2024

(51) Int. Cl.

*F01D 5/28* (2006.01)
*F01D 5/14* (2006.01)

(52) U.S. Cl.

CPC ............. *F01D 5/282* (2013.01); *F01D 5/147* (2013.01); *F05D 2300/6034* (2013.01); *F05D 2300/612* (2013.01)

(58) Field of Classification Search

CPC . F01D 5/282; F01D 5/147; F01D 5/14; F01D 5/28; F01D 5/284; F01D 5/286; F05D 2300/6034; F05D 2300/612

See application file for complete search history.

(56) References Cited

U.S. PATENT DOCUMENTS

| | | | | |
|---|---|---|---|---|
| 4,111,606 | A * | 9/1978 | Prewo | C22C 47/068 416/241 A |
| 4,648,921 | A | 3/1987 | Nutter, Jr. | |
| 5,013,216 | A * | 5/1991 | Bailey | D04C 1/06 29/889.71 |
| 5,279,892 | A | 1/1994 | Baldwin et al. | |
| 5,308,228 | A | 5/1994 | Benoit et al. | |
| 8,105,042 | B2 | 1/2012 | Parkin et al. | |
| 8,419,374 | B2 | 4/2013 | Huth et al. | |
| 8,573,947 | B2 | 11/2013 | Klinetob et al. | |
| 8,696,319 | B2 | 4/2014 | Naik | |
| 8,956,105 | B2 * | 2/2015 | Uskert | F01D 5/189 416/241 B |
| 9,139,287 | B2 | 9/2015 | Folsom et al. | |
| 10,358,929 | B2 | 7/2019 | McCaffrey et al. | |
| 10,563,522 | B2 | 2/2020 | Thomas et al. | |
| 11,090,880 | B2 | 8/2021 | Amat | |
| 11,162,377 | B2 | 11/2021 | Shinavski et al. | |

(Continued)

FOREIGN PATENT DOCUMENTS

| | | | | |
|---|---|---|---|---|
| CN | 101046159 | A * | 10/2007 | F01D 5/16 |
| CN | 112112835 | A * | 12/2020 | B29C 70/342 |

(Continued)

*Primary Examiner* — David E Sosnowski
*Assistant Examiner* — Wayne A Lambert
(74) *Attorney, Agent, or Firm* — McGarry Bair PC

(57) ABSTRACT

A gas turbine engine includes a compressor section, combustor section, and turbine section in serial flow arrangement, and defining an engine longitudinal axis. Sets of blades can be rotatably driven about the longitudinal axis in the compressor section and the turbine section, with adjacent vanes provided between sets of blades. The airfoil structure defining one or more of the blades or vanes can include a core structure which includes a woven or foam core, with an exterior woven layer.

18 Claims, 6 Drawing Sheets

(56) References Cited

U.S. PATENT DOCUMENTS

| | | | | |
|---|---|---|---|---|
| 11,187,084 | B2 | 11/2021 | Backhouse et al. | |
| 11,371,365 | B2 * | 6/2022 | Okabe | B32B 5/26 |
| 2005/0158171 | A1 * | 7/2005 | Carper | C04B 35/62868<br>415/200 |
| 2005/0186069 | A1 * | 8/2005 | Subramanian | F01D 5/284<br>415/200 |
| 2007/0036658 | A1 * | 2/2007 | Morris | F01D 5/16<br>416/229 A |
| 2007/0122606 | A1 * | 5/2007 | Meier | F01D 5/28<br>428/313.9 |
| 2011/0176927 | A1 * | 7/2011 | Alexander | F01D 5/286<br>29/889.71 |
| 2013/0084189 | A1 * | 4/2013 | Diego | C04B 37/005<br>416/241 B |
| 2013/0136616 | A1 | 5/2013 | Prunet | |
| 2013/0259701 | A1 * | 10/2013 | Dambrine | B22F 3/15<br>228/176 |
| 2013/0272893 | A1 * | 10/2013 | Fabre | B29C 70/08<br>416/226 |
| 2013/0330496 | A1 * | 12/2013 | Kray | B29C 70/086<br>416/223 R |
| 2016/0032939 | A1 * | 2/2016 | Anderson | F04D 29/324<br>156/60 |
| 2016/0201478 | A1 * | 7/2016 | Kray | F01D 5/147<br>415/200 |
| 2016/0201480 | A1 * | 7/2016 | Foster | B29D 99/0028<br>415/200 |
| 2017/0298745 | A1 * | 10/2017 | Freeman | F01D 5/225 |
| 2018/0036914 | A1 * | 2/2018 | Marsal | B29C 70/24 |
| 2019/0331127 | A1 * | 10/2019 | Foster | F04D 29/388 |
| 2020/0300093 | A1 * | 9/2020 | Drescher | B22F 10/20 |
| 2021/0079798 | A1 | 3/2021 | Backhouse et al. | |

FOREIGN PATENT DOCUMENTS

| | | | | |
|---|---|---|---|---|
| FR | 3076851 | A1 * | 7/2019 | B22C 21/14 |
| WO | 2015034630 | A1 | 3/2015 | |
| WO | WO-2020209847 | A1 * | 10/2020 | |

* cited by examiner

TURBINE ENGINE AIRFOIL WITH A WOVEN CORE AND WOVEN LAYER

TECHNICAL FIELD

The present disclosure relates generally to a core for a component of a gas turbine, and more specifically to an airfoil having a woven core geometry.

BACKGROUND

A turbine engine typically includes an engine core with a compressor section, a combustor section, and a turbine section in serial flow arrangement. A fan section can be provided upstream of the compressor section. The compressor section compresses air which is channeled to the combustor section where it is mixed with fuel, where the mixture is then ignited for generating hot combustion gases. The combustion gases are channeled to the turbine section which extracts energy from the combustion gases for powering the compressor section, as well as for producing useful work to propel an aircraft in flight or to power a load, such as an electrical generator.

Forming engine components is commonly achieved by casting. Casting is a common manufacturing technique for forming various components of a gas turbine aviation engine. Casting a component involves a mold having a void in the form of a negative of the desired component shape, filling the void with a flowable material, letting the material harden, and removing the mold.

Composite materials typically include a fiber-reinforced matrix and exhibit a high strength to weight ratio. Due to the high strength to weight ratio and moldability to adopt relatively complex shapes, composite materials are utilized in various applications, such as a turbine engine or an aircraft. Composite materials can be, for example, installed on or define a portion of the fuselage and/or wings, rudder, manifold, airfoil, or other components of the aircraft or turbine engine. Extreme loading or sudden forces can be applied to the composite components of the aircraft or turbine engine. For example, extreme loading can occur to one or more airfoils during ingestion of various materials by the turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
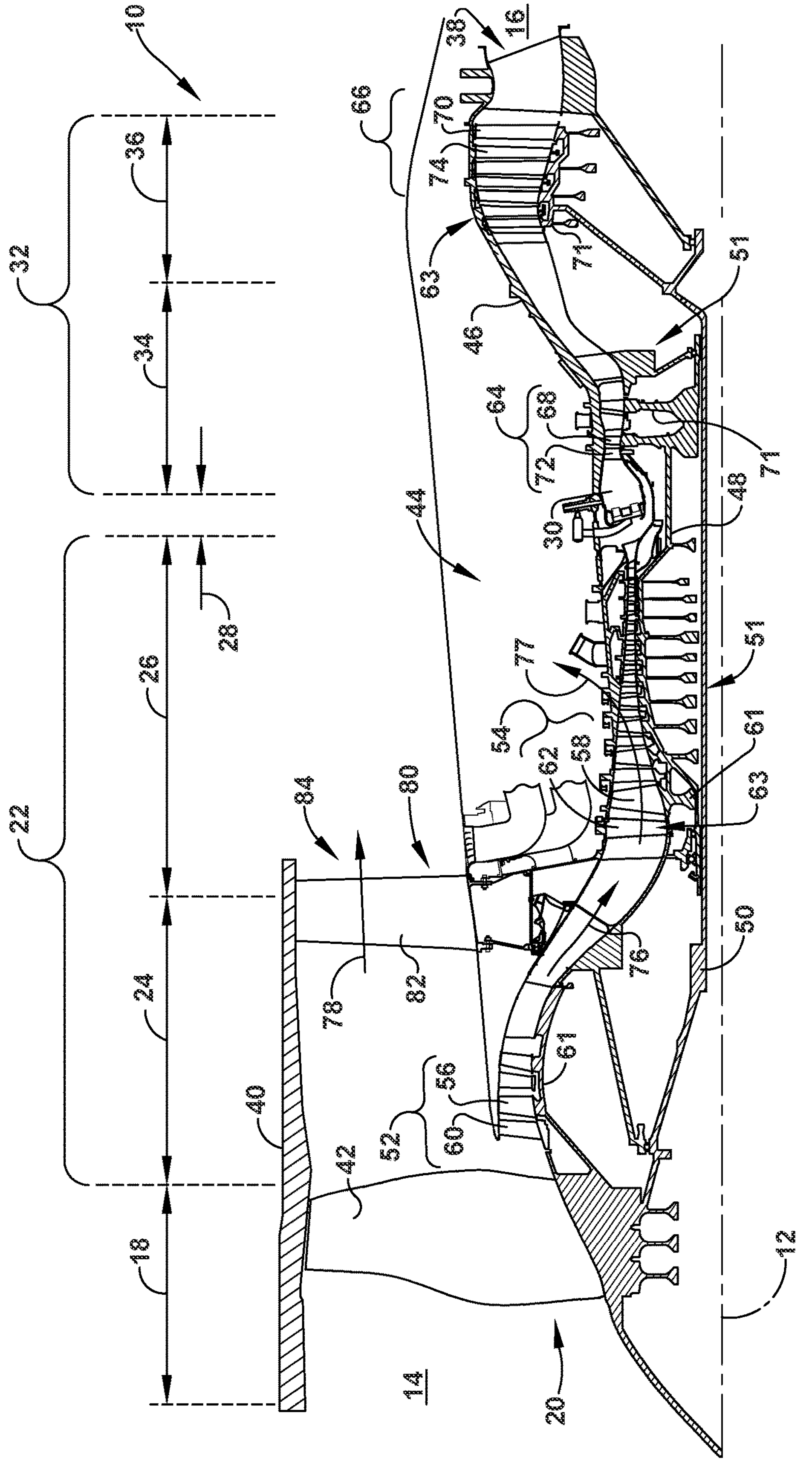
FIG. 1 is a schematic cross-sectional view of a turbine engine in accordance with an exemplary embodiment of the present disclosure.

Aspects of the disclosure herein are directed to a manufactured core used for an engine component, such as an airfoil. The core includes a woven core, and can include additional woven layers forming the engine component. The woven core is used to create an engine component for a turbine engine. Such an engine component can be an airfoil, for example. It should be understood, however, that the disclosure applies to other engine components of the turbine engine, such as a combustor liner or a disk in non-limiting examples. Further, while described in terms of a core used in the manufacture of an airfoil, it will be appreciated that the present disclosure is applied to any other suitable environment.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word “exemplary” is used herein to mean “serving as an example, instance, or illustration.” Any implementation described herein as “exemplary” is not necessarily to be construed as preferred or advantageous over other implementations. Additionally, unless specifically identified otherwise, all embodiments described herein should be considered exemplary.

As used herein, the terms “first”, “second”, and “third” may be used interchangeably to distinguish one component from another and are not intended to signify location or importance of the individual components.

As used herein, the term “upstream” refers to a direction that is opposite the fluid flow direction, and the term “downstream” refers to a direction that is in the same direction as the fluid flow. The terms “fore” or “forward” mean in front of something and “aft” or “rearward” mean behind something. For example, when used in terms of fluid flow, fore/forward can mean upstream and aft/rearward can mean downstream.

The term “fluid” may be a gas or a liquid, or multi-phase.

Additionally, as used herein, the terms “radial” or “radially” refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) as may be used herein are only used for identification purposes to aid the reader’s understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that those two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

As used herein, the term "stiffness" may be used as defining the extent to which a structure resists deformation in response to force. Stiffness can be defined as the ratio of force to displacement of the object under said force. Stiffness can include resisting deformation in response to force applied from various directionalities, whereby the stiffness can represent an axial stiffness, tensile stiffness, compression stiffness, torsional stiffness, or shear stiffness in non-limiting examples.

As used herein, the term "elasticity"" may be used as defining the modulus of elasticity under tension or compression, can may relate to an elasticity for a particular material or structure made of such material, such as the engine components described herein. The elasticity can represent the stress per unit area relative to the local strain or proportional deformation thereof.

The term "composite," as used herein is, is indicative of a component having two or more materials A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC), carbon fibers, a polymeric resin, a thermoplastic resin, bismaleimide (BMI) materials, polyimide materials, an epoxy resin, glass fibers, and silicon matrix materials.

As used herein, a "composite" component refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. Adhesives can include resin and phenolics, wherein the adhesive can require curing at elevated temperatures or other hardening techniques.

As used herein, PMC refers to a class of materials. By way of example, the PMC material is defined in part by a prepreg, which is a reinforcement material pre-impregnated with a polymer matrix material, such as thermoplastic resin. Non-limiting examples of processes for producing thermoplastic prepregs include hot melt pre-pregging in which the fiber reinforcement material is drawn through a molten bath of resin and powder pre-pregging in which a resin is deposited onto the fiber reinforcement material, by way of non-limiting example electrostatically, and then adhered to the fiber, by way of non-limiting example, in an oven or with the assistance of heated rollers. The prepregs can be in the form of unidirectional tapes or woven fabrics, which are then stacked on top of one another to create the number of stacked plies desired for the part.

Multiple layers of prepreg are stacked to the proper thickness and orientation for the composite component and then the resin is cured and solidified to render a fiber reinforced composite part. Resins for matrix materials of PMCs can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific example of high performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead thermally decompose when sufficiently heated. Notable examples of thermoset resins include epoxy, bismaleimide (BMI), and polyimide resins.

Instead of using a prepreg, in another non-limiting example, with the use of thermoplastic polymers, it is possible to utilize a woven fabric. Woven fabric can include, but is not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers or matrix material to a mold or cavity. The dry fibers or matrix material can include prepreg, braided material, woven material, or any combination thereof.

Resin can be pumped into or otherwise provided to the mold or cavity to impregnate the dry fibers or matrix material. The combination of the impregnated fibers or matrix material and the resin are then cured and removed from the mold. When removed from the mold, the composite component can require post-curing processing.

It is contemplated that RTM can be a vacuum assisted process. That is, the air from the cavity or mold can be removed and replaced by the resin prior to heating or curing. It is further contemplated that the placement of the dry fibers or matrix material can be manual or automated.

The dry fibers or matrix material can be contoured to shape the composite component or direct the resin. Optionally, additional layers or reinforcing layers of a material differing from the dry fiber or matrix material can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO_2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to as their combination of type of fiber/type of matrix. For example, C/SiC for carbon-fiber-reinforced silicon carbide; SiC/SiC for silicon carbide-fiber-reinforced silicon carbide, SiC/SiN for silicon carbide fiber-reinforced silicon nitride; SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3 \cdot 2SiO_2$), as well as glassy aluminosilicates.

In certain non-limiting examples, the reinforcing fibers may be bundled and/or coated prior to inclusion within the ceramic matrix. For example, bundles of the fibers may be formed as a reinforced tape, such as a unidirectional reinforced tape. A plurality of the tapes may be laid up together to form a preform component. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or burn-out to yield a high char residue in the preform, and subsequent melt-infiltration with silicon, or a cure or pyrolysis to yield a silicon carbide matrix in the preform, and subsequent chemical vapor infiltration with silicon carbide. Additional steps may be taken to improve densification of the preform, either before or after chemical vapor infiltration, by injecting it with a liquid resin or polymer followed by a thermal processing step to fill the voids with silicon carbide. CMC material as used herein may be formed using any known or hereinafter developed methods including but not limited to melt infiltration, chemical vapor infiltration, polymer impregnation pyrolysis (PIP), or any combination thereof.

Such materials, along with certain monolithic ceramics (i.e., ceramic materials without a reinforcing material), are particularly suitable for higher temperature applications. Additionally, these ceramic materials are lightweight compared to superalloys, yet can still provide strength and durability to the component made therefrom. Therefore, such materials are currently being considered for many gas turbine components used in higher temperature sections of gas turbine engines, such as airfoils (e.g., turbines, and vanes), combustors, shrouds and other like components, that would benefit from the lighter-weight and higher temperature capability these materials can offer.

The terms "metallic" as used herein are indicative of a material that includes metal such as, but not limited to, titanium, iron, aluminum, stainless steel, and nickel alloys. A metallic material or alloy can be a combination of at least two or more elements or materials, where at least one is a metal.

The inventors' practice has proceeded in the foregoing manner of designing a core used in the manufacture of a component such as an airfoil, designing the airfoil to have improved stiffness transition between the core and an exterior skin, decreased weight, identifying whether or not the component was manufactured as designed and satisfies component objectives, and modifying the engine component with new geometric characteristics in an iterative process when the engine component does not satisfy component objectives. This process is repeated during the design of several different types of components, such as those shown in FIG. 1.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by a core casing 46, which can be coupled with the fan casing 40.

An HP shaft or spool 48 disposed coaxially about the engine centerline 12 of the turbine engine 10 drivingly connects the HP turbine 34 to the HP compressor 26. An LP shaft or spool 50, which is disposed coaxially about the engine centerline 12 of the turbine engine 10 within the greater diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating compressor blades 56, 58. It is noted that the number of blades, vanes, and compressor stages shown in FIG. 1 were selected for illustrative purposes only, and that other numbers are possible.

The compressor blades 56, 58 for a stage of the compressor can be mounted to (or integral to) a disk 61, which is mounted to the corresponding one of the HP and LP spools 48, 50. The static compressor vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74, also referred to as a nozzle, to extract energy from the stream of fluid passing through the stage. In a single turbine stage 64, 66, multiple turbine blades 68, 70 can be provided in a ring and can extend radially outwardly relative to the engine centerline 12 while the corresponding static turbine vanes 72, 74 are positioned upstream of and adjacent to the rotating turbine blades 68, 70. It is noted that the number of blades, vanes, and turbine stages shown in FIG. 1 were selected for illustrative purposes only, and that other numbers are possible.

The turbine blades 68, 70 for a stage of the turbine can be mounted to a disk 71, which is mounted to the corresponding one of the HP and LP spools 48, 50. The static turbine vanes 72, 74 for a stage of the compressor can be mounted to the core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies a pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and an exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased above the bleed air temperature. The bleed air 77 may be used to reduce the temperature of the core components downstream of the combustor 30.

A remaining portion of the airflow 78 bypasses the LP compressor 24 and engine core 44 and exits the turbine engine 10 through a stationary vane row, and more particularly an outlet guide vane assembly 80, comprising a plurality of airfoil guide vanes 82, at a fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the turbine engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
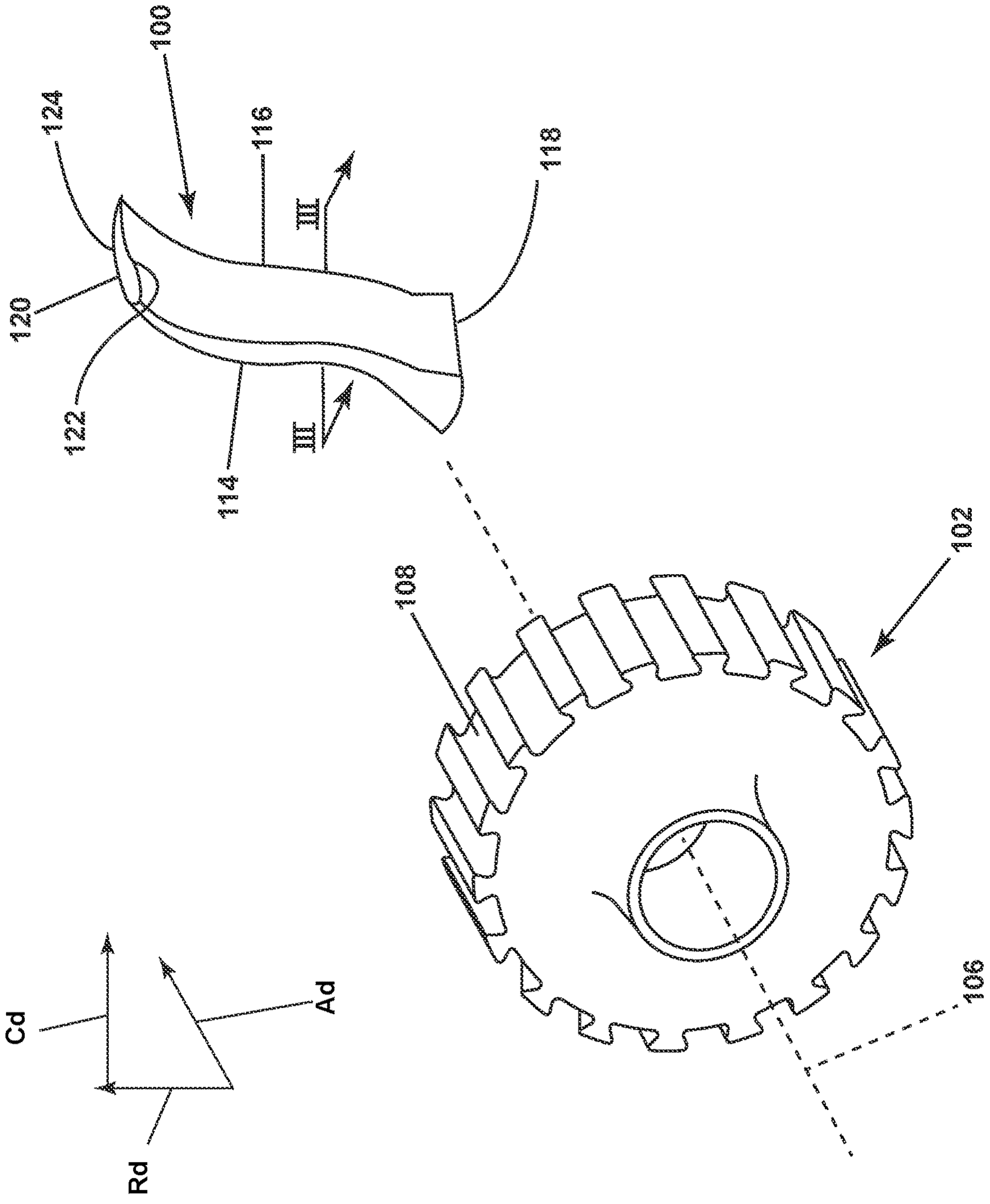
FIG. 2 is a schematic perspective view of a composite airfoil assembly and disk assembly suitable for use within the turbine engine of FIG. 1, in accordance with an exemplary embodiment of the present disclosure.

FIG. 2 is a schematic perspective view of a composite airfoil assembly 100 and a disk assembly 102 suitable for use within the turbine engine 10 of FIG. 1. The disk assembly 102 is suitable for use as the disk 61, 71 (FIG. 1) or any other disk such as, but not limited to, a disk within the fan section 18, the compressor section 22, or the turbine section 32 of the turbine engine 10. The composite airfoil assembly 100 can be rotating or non-rotating such that the composite airfoil assembly 100 can include at least one of the static compressor vanes 60, 62 (FIG. 1), the set of compressor blades 56, 58 (FIG. 1), the static turbine vanes 72, 74 (FIG. 1), the set of turbine blades 68, 70 (FIG. 1), or the plurality of fan blades 42 (FIG. 1). As a non-limiting example, the composite airfoil assembly 100 can be a composite fan blade assembly. In one example, the composite airfoil assembly 100 can include additional elements, such as a metal bonded portion or tip cap, as would be known by persons of ordinary skill in the art, although such additional elements are not depicted here.

The disk assembly 102 can be rotatable or stationary about a rotational axis 106. The rotational axis 106 can coincide with or be offset from the engine centerline (e.g., the engine centerline 12 of FIG. 1). The disk assembly 102 includes a plurality of slots 108 extending axially through a radially outer portion of the disk assembly 102 and being circumferentially spaced about the disk assembly 102, with respect to the rotational axis 106.

The composite airfoil assembly 100 extends between a leading edge 114 and a trailing edge 116 to define a chord-wise direction, and extends between a root 118 and a tip 120 to define a span-wise direction. The composite airfoil assembly 100 includes a pressure side 122 and a suction side 124.

The composite airfoil assembly 100 is coupled to the disk assembly 102 by inserting at least a portion of the composite airfoil assembly 100 into a respective slot of the plurality of slots 108. The composite airfoil assembly 100 is held in place by frictional contact with the slot 108 or can be coupled to the slot 108 via any suitable coupling method such as, but not limited to, welding, adhesion, fastening, or the like. While only a single composite airfoil assembly 100 is illustrated, it will be appreciated that there can be any number of one or more composite airfoils assemblies 100 coupled to the disk assembly 102. As a non-limiting example, there can be a plurality of composite airfoil assemblies 100 corresponding to a total number of slots of the plurality of slots 108.

For the sake of reference, a set of relative reference directions, along with a coordinate system can be applied to the composite airfoil assembly 100. An axial direction (Ad) can extend from forward to aft and is shown extending at least partially into the page. The axial direction (Ad) and can be arranged parallel to the rotational axis 106. A radial direction (Rd) extends perpendicular to the axial direction (Ad) and can extend perpendicular to the engine centerline 12. A circumferential direction (Cd) can be defined perpendicular to the radial direction (Rd) and can be defined along the circumference of the turbine engine 10 relative to the engine centerline 12 or rotational axis 106.

Figure 3:
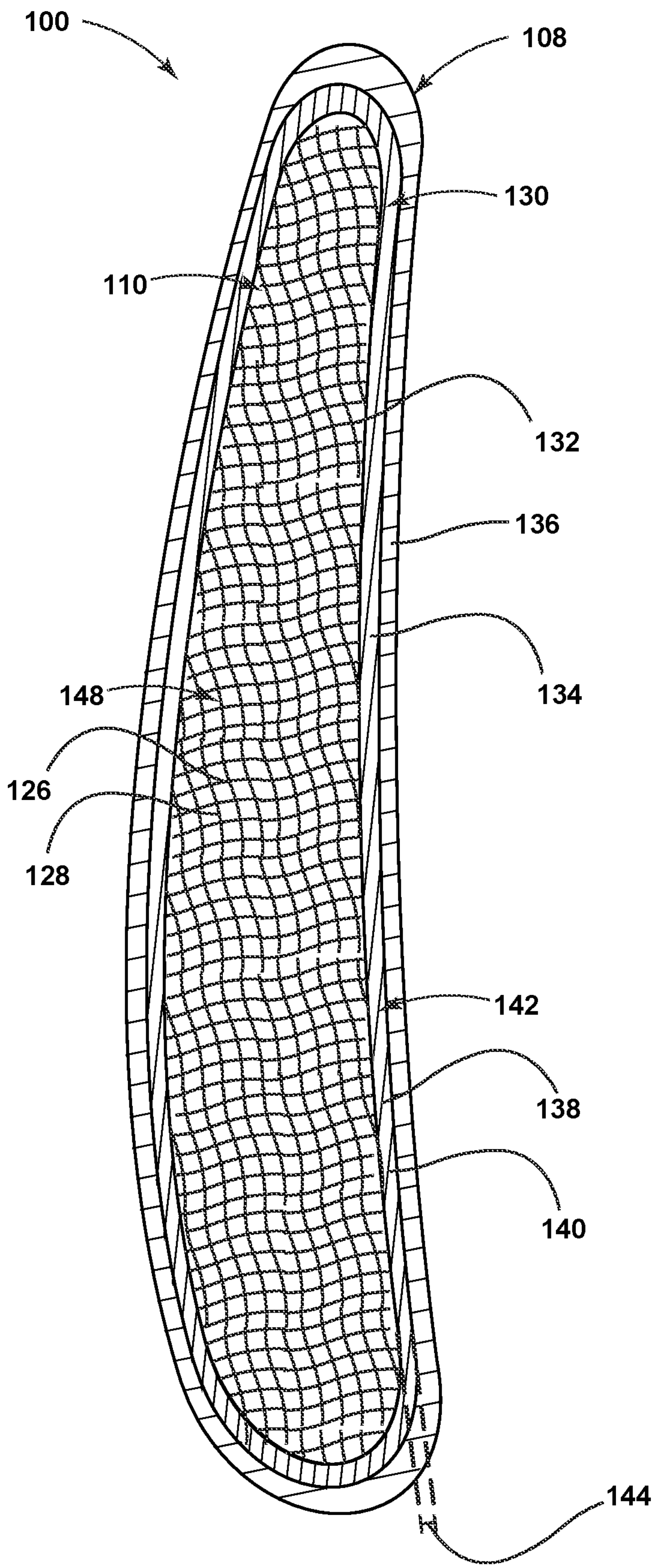
FIG. 3 is a schematic cross-sectional view taken along line III-III of FIG. 2 showing an interior of the composite airfoil assembly, including a woven core and an over braid, in accordance with an exemplary embodiment of the present disclosure.

FIG. 3 shows a cross-sectional view of the composite airfoil assembly 100 of FIG. 2, taken along section III-III, illustrating an interior 110 of the composite airfoil assembly 100. It is contemplated that the composite airfoil assembly 100 can be a fan blade, a rotating blade, or a stationary vane, in non-limiting examples. A core structure 130 is provided within the interior 110, and includes a woven core 132, an over braid 134, and a laminate skin 136.

The woven core 132 can be made of a woven structure. Such a woven structure can be a three-dimensional woven structure defining a first three-dimensional weave pattern. More specifically, the woven structure can be woven in a combination of the axial direction Ad, the radial direction Rd, and the circumferential direction Cd (FIG. 2), while it should be appreciated that the weave pattern can be formed and defined separate from the turbine engine 10, such that the weave pattern is woven in any three, mutually-orthogonal planes in order to define a three-dimensional object relative to said planes. In one non-limiting example, the woven structure can include a three-dimensional weaving including a first set of fibers 148 arranged as a set of warp fibers 126 and a set of weft fibers 128 which can be interlaced or woven in three directions to form a three-dimensional structure for the woven core 132. The three directions for the set of warp fibers 126 and set of weft fibers 128 can be defined along or angled relative to the axial direction Ad, the radial direction Rd, and the circumferential direction Cd. In one non-limiting example, a Jacquard loom, or 3D weaving machine can be used to create complex three-dimensional woven structures, which can include interweaving one or more composites to form the woven core 132. The woven core 132 can be comprised of composite materials, such as carbon or carbon fiber, glass or glass fiber, nylon, rayon, or other aramid fibers, while other materials such as nickel, titanium, or ceramic composites are contemplated in non-limiting examples.

The woven core 132, or the woven core 132 and one or more exterior layer, such as the over braid 134 or other woven layer, which can collectively define a core preform. The laminate skin 308 can be applied as a plurality of laminated plies upon the core preform.

The over braid 134 can be formed as a three-dimensional woven structure, having a second three-dimensional weave pattern, and including a second set of fibers 142 having a second set of warp fibers 138 and a second set of weft fibers 140. The second set of warp fibers 140 and the second set of weft fibers 140 can have a braided or a plaited geometry or pattern. A braided or a plaited geometry or pattern can include a weave pattern that includes three or more interlaced fibers, tows, yarns, or strands that are woven in a repeating pattern, for example. In another non-limiting example, the braided geometry can include where the second set of fibers 142 are sequentially laid over one another to define the braided geometry. The braided geometry or pattern can include a thickness 144. Tows or yarns made of individual fibers may be made from between 1000-24000 fibers, whereby the thickness 144 can be at least three times the thickness of an individual tow or yarn. In one non-limiting example, it is contemplated that the thickness 144 varies along the woven core 132. The braided geometry or pattern can repeat for the entirety of the over braid 134, or only a portion thereof, where one or more additional braided geometries define the over braid 134. Such additional braided geometries can be similar, where the arrangement of the second set of fibers 142 for one geometry is the same for another geometry, but the orientation is different, or where the arrangement of the second set of fibers 142 is different, and the orientation can be similar or dissimilar. The over braid 134 can be formed with a Jacquard loom or 3D weaving machine with composite materials which can be similar or different from that of the woven core 132. In non-limiting examples, the over braid 134 can be comprised of composite materials, such as carbon or carbon fibers, glass or glass fibers, nylon, rayon, or other aramid fibers, while other materials such as nickel, titanium, or ceramic composites are contemplated in non-limiting examples. The braided geometry for the over braid 134 defines a woven geometry that is different than a woven geometry of the woven core 132, despite both being woven. Such a difference can include a difference in material, alignment, arrangement, or being offset from one another, in non-limiting examples. It is contemplated that the over braid 134 can fully cover or encase the woven core 132, while alternative non-limiting examples can include a partial cover, or multiple discrete over braid portions fully or partially covering the woven core 132.

The laminate skin 136 can be formed as a set of laminate layers, located on, around, or about the over braid 134. The laminate skin 136 can form an exterior wall 146, while it is contemplated that one or more additional exterior layers are provided on the laminate skin 136, such as a layer which resists oxidation or corrosion. Such an exterior layer can be a woven layer (not shown), for example, which can include a third three-dimensional weave pattern different than the first and second three-dimensional weave patterns. See FIG. 5, for example.

During manufacture, the woven core 132 can be formed defining a specific woven structure. The specific woven structure can be specified to have a predetermined geometry, or can be cut or otherwise sized and shaped after manufacture of the woven structure, such as by cutting or grinding the woven core 132 to a desired shape. The over braid 134 can be applied directly onto the woven core 132, or alternatively, it is contemplated that an intermediate layer is provided therebetween. Such an intermediate layer can be an adhesive layer, for example, securing the over braid 134 onto the woven core 132. The woven structures of the woven core 132 and the over braid 134 provide for greater adhesion, as opposed to the adhesion between one or more non-woven layers.

The laminate skin 136 can be applied on the over braid 134. The laminate skin 136 can be sized and shaped to form the exterior airfoil shape, and at least partially define the outer wall 146, while additional features, can further define the final shape of the outer wall 146. An intermediate layer (not shown) between the over braid 134 and the laminate skin 136 is further contemplated, such as an adhesive layer in one non-limiting example. The structure of the over braid 134 can increase adhesion of the laminate skin 136, compared to adhesion to a non-braided surface. Exterior barrier coatings can be provided exterior of the laminate skin 136, such as barrier coatings to prevent erosion due to object impact, hydrophobic or ice-phobic coatings, or ultraviolet resistant coatings. Additional finishing layers or materials can be provided on the laminate skin 136 as necessary, such as oxidation or corrosion resistant coatings or paint.

The architecture of the core structure 130 defines a geometry that better matches the stiffness transition between the woven core 132, the over braid 134, and the laminate skin 136. More specifically, the woven core 132 can include a first stiffness, defined by the architecture and geometry of the weave pattern forming the woven core 132. Similarly, the over braid 134 can include a second stiffness, and the laminate skin 136 can include a third stiffness. The second stiffness is between or operates as an intermediate stiffness between the woven core 132 and the laminate skin 136, providing for a smoother stiffness transition between the woven core 132 and the laminate skin 136. More specifically, the stiffness can be defined, and therefore measured, in at least one direction. Therefore, the second stiffness can be between the first stiffness and the third stiffness when measured in a common direction. Non-limiting examples of directions can include a spanwise direction, a chord-wise direction, an axial direction, a radial direction, a circumferential direction, or any combination thereof. A large variation of stiffness for the woven core 132 and the laminate skin 136 can lead to component degradation. Providing the intermediate woven structure having an intermediate stiffness reduces, decreases, or otherwise improves said degradation by transitioning between the woven core stiffness and the laminate skin stiffness.

Furthermore, the over braid 134, or other woven layer, can aid in facilitating handling of a dry preform, before being injected with an interior resin or other material, which would otherwise require careful handling, thereby decreasing cost and complexity of the formation process.

Figure 4:
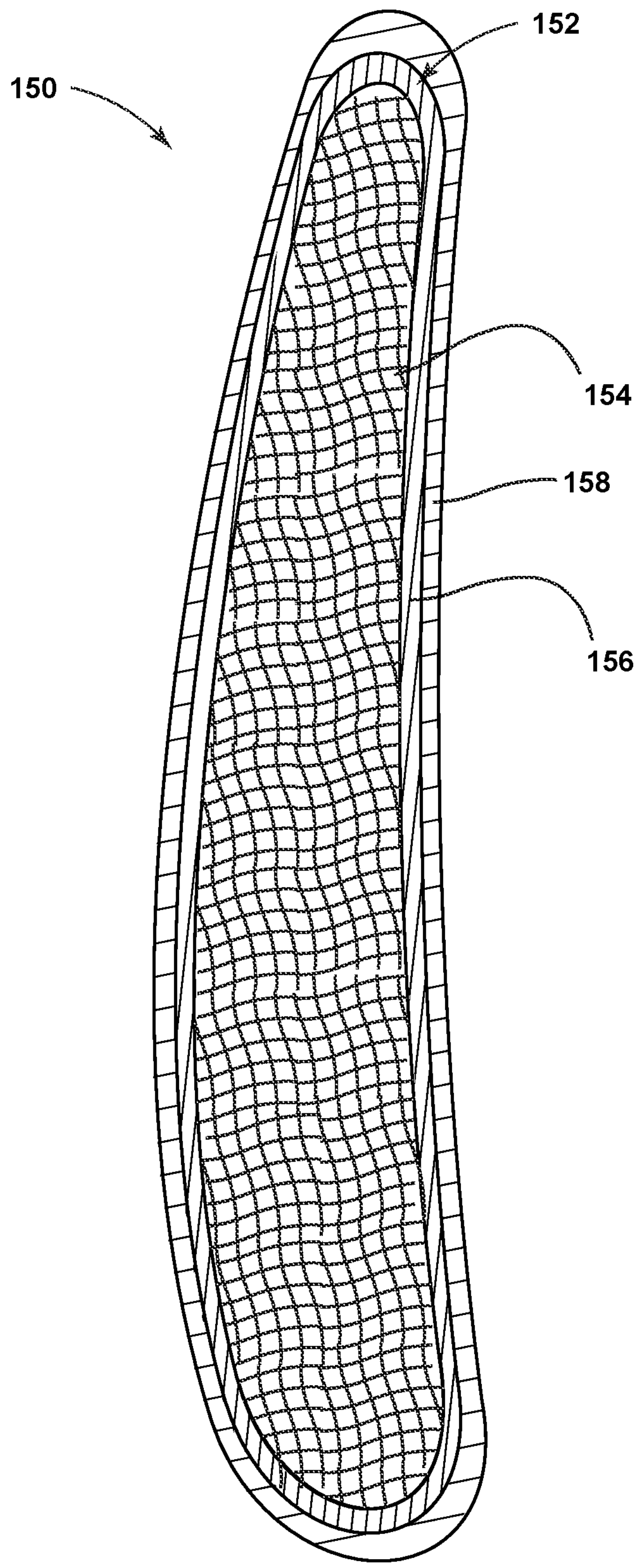
FIG. 4 is a schematic cross-sectional view of an alternative airfoil, including a braided woven core and a woven layer over the braided woven core, suitable for use within the turbine engine of FIG. 1, in accordance with an exemplary embodiment of the present disclosure.

FIG. 4, shows an alternative composite airfoil assembly 150 having a core structure 152 similar to that of FIG. 3, that includes a braided woven core 154, whereby the core structure 152 includes a braided pattern. A woven layer 156 is positioned over the braided woven core 154 includes a braided or non-braided woven pattern. Where the woven layer 156 includes a braided pattern, it is contemplated that braid pattern or the weave pattern for the woven layer 156 is different than that of the braided woven core 154. In an example where the braid pattern is the same among the braided woven core 154 and the woven layer 156, it is contemplated that the geometry or the orientation among the braided woven core 154 and the woven layer 156 can be different, such that the braid pattern among the two is misaligned or offset. A laminate skin 158 can then be provided on the woven layer 156.

Using the braided woven core 154 can better match the stiffness of the woven layer 156. Similarly, the woven layer 156 can better match the stiffness of the laminate skin 158, improving overall structural durability of the composite airfoil assembly 150.

Figure 5:
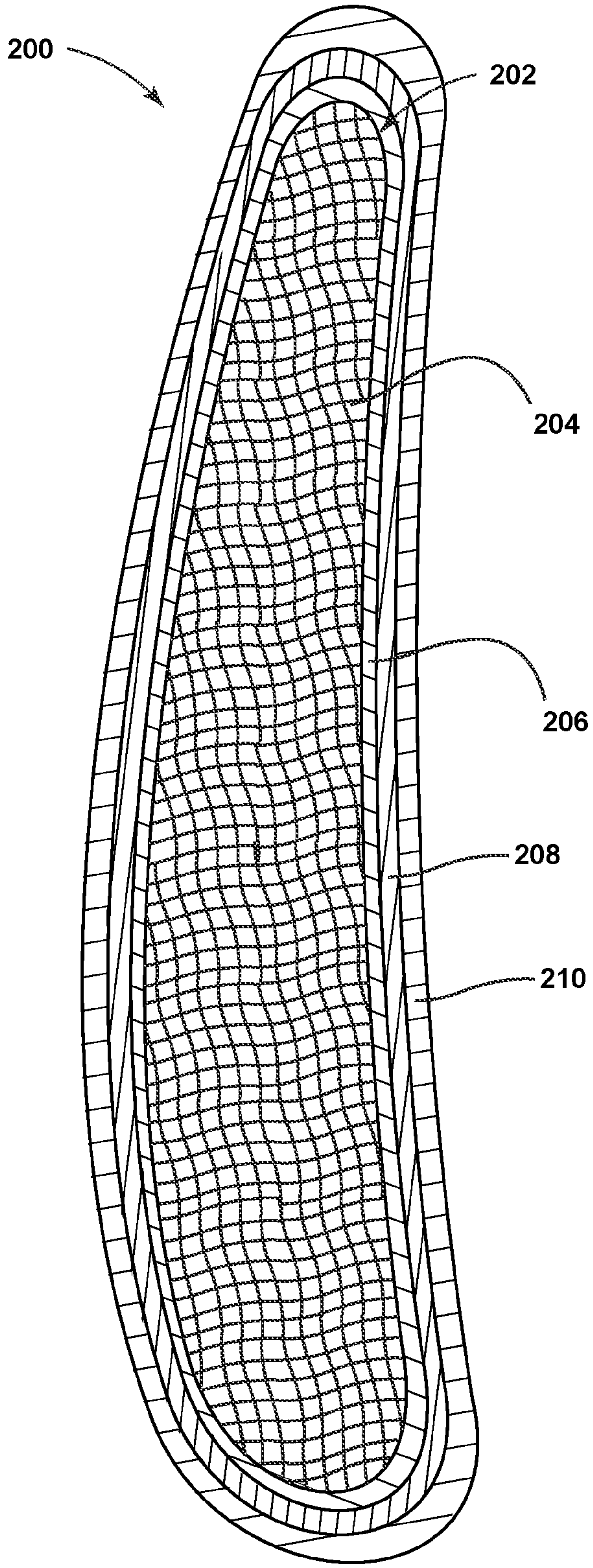
FIG. 5 is a schematic cross section view, showing an alternative exemplary interior for a composite airfoil assembly including a woven core and a woven outer layer, suitable for use within the turbine engine of FIG. 1, in accordance with an exemplary embodiment of the present disclosure.

FIG. 5 shows a schematic cross-sectional view a composite airfoil assembly 200, having an interior 202 including a woven core 204, an over braid 206, a laminate skin 208, and a woven outer layer 210. The woven core 204, over braid 206, and laminate skin 208 can be identical or similar to the woven core 132, over braid 134, and the laminate skin 136 of FIG. 3, in one non-limiting example. The woven outer layer 210 can be a woven layer, similar to that of the woven core 204, including a first three-dimensional woven or braided geometry or pattern. The woven core 204 can be formed by a Jacquard loom or three-dimensional weaving machine, for example. The over braid 206 can include a second three-dimensional weave pattern, that can be different than the first three-dimensional weave pattern.

The woven outer layer 210 can be utilized to provide a better stiffness transition exterior of the laminate skin 208, as opposed to a system without the outer woven outer layer 210. The woven outer layer 210 can include a third three-dimensional weave pattern which can be different than the first and second three-dimensional weave patterns, or can be similar or the same as the second three-dimensional weave pattern. In one non-limiting example, the third three-dimensional weave pattern can be a braided weave pattern. Additional outer layers can be provided on the woven outer layer 210, and the woven outer layer 210 can transition between the stiffness of the laminate skin 208, and any additional outer layers exterior of the outer woven outer layer 210. Additionally, utilizing a woven outer layer 210 over the laminate skin 208 aids in handling and manufacture, as handing the woven outer layer 210 before resin injection is easier than handling the laminate skin 208. Additionally, it is contemplated that additional exterior layers can be provided on the woven outer layer 210, such as an outer layer make of a material to resist corrosion or oxidization.

Figure 6:
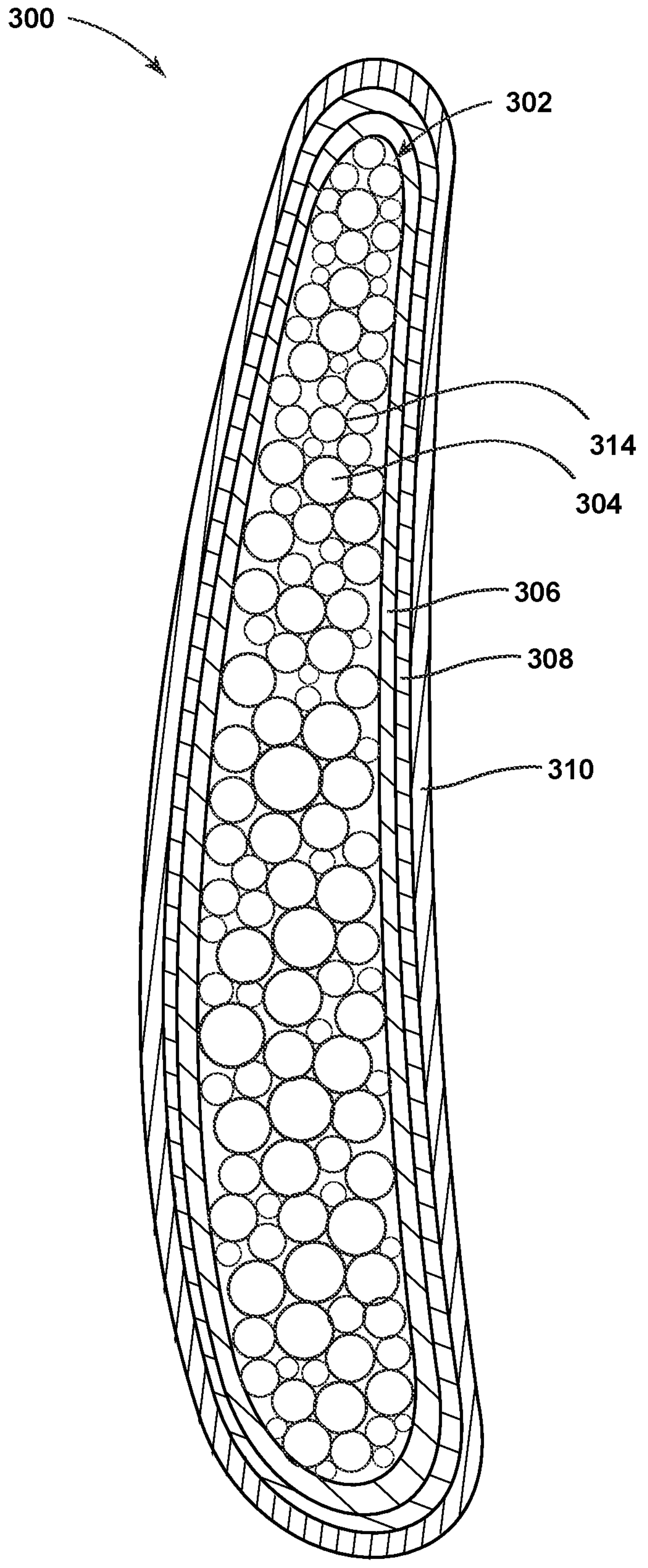
FIG. 6 is a schematic cross section view, showing another exemplary alternative interior for a composite airfoil assembly, including a foam core with a woven layer located on the foam core, suitable for use within the turbine engine of FIG. 1, in accordance with an exemplary embodiment of the present disclosure.

FIG. 6 shows a schematic cross-sectional view a composite airfoil assembly 300, including an interior 302 including a foam core 304, a woven layer 306, a laminate skin 308, and a woven outer layer 310. The foam core 304 can be a solid foam structure defining a porous foam pattern, including a plurality of pores 314. For example, a porous metal material, such as a closed-cell foam or an open-cell foam is contemplated in non-limiting examples, or can include powder-formed foams, gas injection foams, admixing blowing agents, or precipitated gas foams, as well as composite metal foams in additional non-limiting examples.

The woven layer 306 can be a preform, for example, which can be a preform sized to surround or position about the foam core 304. In another example, the woven layer 306 can be an over braid, similar to the over braid 134, 206 of FIGS. 3 and 4. The woven layer 306 and the foam core 304 can collectively define a preform. The laminate skin 308 can be applied as a plurality of laminated plies upon the preform. It is further contemplated one or more intermediate adhesive layers are provided to increase adhesion between layers.

The woven outer layer 310 can be identical or similar to that of the woven outer layer 210 of FIG. 4. The woven outer layer 310 can be a three-dimensional woven layer, such as that created by a Jacquard loom or three-dimensional weaving machine, or can be a three-dimensional braided layer, similar to the over braid 134, 206 of FIGS. 3 and 5, for example.

The foam core 304 with the woven layer 306 can better transition between the stiffness of the foam core 304 and the laminate skin 308, while reducing total weight. Similarly, the woven layer 306 can better match the stiffness of the laminate skin 308, improving overall structural durability of the composite airfoil assembly 300. Additional outer layers can be provided on the woven outer layer 310, and the woven outer layer 310 can provide better transition between the stiffness of the laminate skin 308, and any additional outer layers exterior of the woven outer layer 310. Additionally, utilizing a woven outer layer 310 over the laminate skin 308 aids in handling and manufacture, as handling the woven outer layer 310 before resin injection is easier than handling the laminate skin 308.

It should be understood that any core described herein, such as the cores 132, 154, 204, 304, or including such cores with one or more exterior layers, such as the over braid 134, the woven layer 156, the over braid 206, or the woven layer 306, can collectively define a preform. Where a preform can be utilized, it is contemplated that the preform be woven, braided, or otherwise created, and then shaped or cut to a desired shape. It is further contemplated that the preform can be formed as a desired shape, and need not be shaped or cut. The laminate skin 308 can be applied as a plurality of laminated plies upon the preform. In other examples, it is contemplated that the exterior layers alone can form a preform, which can be applied to a core, preform or not.

The benefits associated with utilizing a woven or braided core, along with one or more additional woven or braided exterior layers, can provide for better stiffness transition between different layers or portions of the airfoil. Improved stiffness transition can lead to improved bonding between layers, Utilizing a woven or braided core can reduce weight and cost of an airfoil component, while still maintaining the structural rigidity and stiffness required for harsh engine operating conditions. Similarly, utilizing a woven layer with a foam core can provide for improved stiffness transition between the foam core and a laminate skin or other exterior layers.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine comprising: a fan section, a compressor section, combustor section, and turbine section in serial flow arrangement, and defining an engine centerline; and a composite assembly provided in one of the fan section, the compressor section, or the turbine section, the composite airfoil assembly comprising: a core defined by a first three-dimensional weave pattern or a first porous foam structure, a woven layer located exterior of the core, the woven layer defined by a second three-dimensional weave pattern, and a laminate skin provided on the woven layer.

The gas turbine engine of any preceding clause wherein the core includes the first three-dimensional weave pattern, and includes a first set of warp fibers and a first set of weft fibers that extend in at least three directions, whereby the three directions define the three dimensions of the three-dimensional weave pattern.

The gas turbine engine of any preceding clause wherein the woven layer includes a second set of warp fibers and a second set of weft fibers that are interlaced in three dimensions.

The gas turbine engine of any preceding clause wherein the woven layer includes a thickness that is at least three times as thick as an individual tow made from at least one of the second wet of warp fibers or the second set of weft fibers.

The gas turbine engine of any preceding clause wherein the core includes a first stiffness, the woven layer includes a second stiffness, and the laminate skin includes a third stiffness, where the first stiffness, the second stiffness, and the third stiffness are different.

The gas turbine engine of any preceding clause wherein the second stiffness is between the first stiffness and the third stiffness defined in at least one direction.

The gas turbine engine of any preceding clause wherein the first stiffness is greater than the second stiffness, and the second stiffness is greater than the third stiffness.

The gas turbine engine of any preceding clause wherein the woven layer fully covers the core.

The gas turbine engine of any preceding clause wherein the woven layer partially covers the core.

The gas turbine engine of any preceding clause wherein the woven layer includes a thickness that varies along the core.

The gas turbine engine of any preceding clause wherein the woven layer is formed as an over braid.

The gas turbine engine of any preceding clause further comprising an outer woven layer provided on the laminate skin.

The gas turbine engine of any preceding clause wherein the outer woven layer includes a third three-dimensional weave pattern that is different than the first three-dimensional weave pattern and the second three-dimensional weave pattern.

The gas turbine engine of any preceding clause wherein the third three-dimensional weave pattern includes a braided weave pattern.

The gas turbine engine of any preceding clause wherein the core is formed from one or more composite materials.

The gas turbine engine of any preceding clause wherein the woven layer is formed from one or more composite materials.

The gas turbine engine of any preceding clause wherein the one or more composite materials include carbon or carbon fibers, glass or glass fibers, nylon, rayon, aramid fibers, nickel, titanium, or ceramic.

The gas turbine engine of any preceding clause wherein the laminate skin comprises a plurality of laminate plies.

The gas turbine engine of any preceding clause further comprising an exterior coating provided on the laminate skin.

The gas turbine engine of any preceding clause wherein the exterior coating is an environmental barrier coating.

The gas turbine engine of any preceding clause wherein the environmental barrier coating is one of an erosion barrier coating, an object impact coating, a hydrophobic coating, an ice-phobic coating, an ultraviolet resistant coating, or a corrosion resistant coating.

The gas turbine engine of any preceding clause wherein the exterior coating is a paint coating.

The gas turbine engine of any preceding clause wherein the first three-dimensional weave pattern is misaligned or offset from the second three-dimensional weave pattern.

The gas turbine engine of any preceding clause further comprising an adhesive layer provided between the core and the woven layer.

The gas turbine engine of any preceding clause further comprising an adhesive layer provided between the woven layer and the laminate skin.

A core for an airfoil for use in a gas turbine engine, the core comprising: an interior core including either a first weave pattern or a porous foam pattern; and at least one three-dimensional woven layer provided on the interior core, the at least one three-dimensional woven layer defined by a second weave pattern that is different than the first weave pattern.

The core of any preceding clause wherein the interior woven core is defined by a three-dimensional braided geometry.

The core of any preceding clause further comprising a laminate skin provided on the at least one three-dimensional woven layer.

The core of any preceding clause wherein the at least one three-dimensional woven layer comprises an interior three-dimensional woven layer and an exterior three-dimensional woven layer.

The core of any preceding clause wherein the interior three-dimensional woven layer is provided on the interior core, and the exterior three-dimensional woven layer is provided on the laminate skin.

A gas turbine engine comprising: a compressor section, a combustor section, and a turbine section in serial flow arrangement, and defining an engine longitudinal axis; and a composite airfoil assembly rotatable about the longitudinal axis, the composite airfoil assembly comprising: a core having a porous geometry or a woven geometry; and at least one three-dimensional woven layer located on the core.

The gas turbine engine of any preceding clause wherein the core includes the porous geometry and is a foam core.

The gas turbine engine of any preceding clause wherein the at least one three-dimensional woven layer includes a set of warp fibers and a set of weft fibers, and wherein the at least one three-dimensional woven layer includes a thickness that is at least three times as thick as an individual tow formed from at least one of the set of warp fibers and the set of weft fibers.

The gas turbine engine of any preceding clause wherein the at least one three-dimensional woven layer includes at least two three-dimensional woven layers.

The gas turbine engine of any preceding clause wherein at least one three-dimensional woven layer of the at least two three-dimensional woven layers comprises a three-dimensional braided layer.

What is claimed is:

1. A gas turbine engine comprising:

a fan section, a compressor section, combustor section, and turbine section in serial flow arrangement, and defining an engine centerline; and a composite airfoil assembly provided in one of the fan section, the compressor section, or the turbine section, the composite airfoil assembly comprising:

a core defined by a first three-dimensional weave pattern or a first porous foam structure, the core defining a first stiffness;

a woven layer located exterior of the core, the woven layer defined by a second three-dimensional weave pattern, the woven layer defining a second stiffness; and a laminate skin located exterior of the woven layer, the laminate skin defining a third stiffness;

wherein the second stiffness is between the first stiffness and the third stiffness is defined in at least one direction defining a stiffness transition between the core and the laminate skin.

2. The gas turbine engine of claim 1 wherein the core includes the first three- dimensional weave pattern, and includes a first set of warp fibers and a first set of weft fibers that extend in at least three directions, whereby the three directions define the three dimensions of the first three-dimensional weave pattern.

3. The gas turbine engine of claim 2 wherein the woven layer includes a second set of warp fibers and a second set of weft fibers that are interlaced in three dimensions.

4. The gas turbine engine of claim 3 wherein the woven layer includes a thickness that is at least three times as thick as an individual tow made from at least one of the second set of warp fibers or the second set of weft fibers.

5. The gas turbine engine of claim 1 wherein the first stiffness, the second stiffness, and the third stiffness are different.

6. The gas turbine engine of claim 1 wherein the woven layer fully covers the core.

7. The gas turbine engine of claim 1 wherein the woven layer is formed as an over braid.

8. The gas turbine engine of claim 1 further comprising an outer woven layer located on the laminate skin, wherein the outer woven layer includes a third three-dimensional weave pattern that is different than the first three-dimensional weave pattern and the second three-dimensional weave pattern.

9. The gas turbine engine of claim 8 wherein the third three-dimensional weave pattern includes a braided weave pattern.

10. A core for an airfoil for use in a gas turbine engine, the core comprising:

an interior core including either a first weave pattern or a porous foam pattern, the core defining a first stiffness;

at least one three-dimensional woven layer provided on the interior core, the at least one three-dimensional woven layer defined by a second weave pattern that is different than the first weave pattern and defining a second stiffness; and a laminate skin provided on the at least one three-dimensional woven layer and defining a third stiffness;

wherein the second stiffness is between the first stiffness and the third stiffness defining a stiffness transition between the core and the laminate skin.

11. The core of claim 10 wherein the interior core is defined by a three-dimensional braided geometry.

12. The core of claim 10 wherein the at least one three-dimensional woven layer comprises an interior three-dimensional woven layer and an exterior three-dimensional woven layer.

13. The core of claim 12 wherein the interior three-dimensional woven layer is provided on the interior core, and the exterior three-dimensional woven layer is provided on the laminate skin.

14. A gas turbine engine comprising:

a fan section, a compressor section, a combustor section, and a turbine section in serial flow arrangement, and defining an engine centerline; and a composite airfoil assembly rotatable about the engine centerline, the composite airfoil assembly comprising:

a core having a porous geometry or a woven geometry, the core defining a first stiffness;

at least one three-dimensional woven layer located on the core and defining a second stiffness; and a laminate skin provided exterior of the at least one three-dimensional woven layer and defining a third stiffness;

wherein the second stiffness is between the first stiffness and the third stiffness defining a stiffness transition between the core and the laminate skin.

15. The gas turbine engine of claim 14 wherein the core includes the porous geometry and is a foam core.

16. The gas turbine engine of claim 15 wherein the at least one three-dimensional woven layer includes a set of warp fibers and a set of weft fibers, and wherein the at least one three-dimensional woven layer includes a thickness that is at least three times as thick as an individual tow formed from at least one of the set of warp fibers and the set of weft fibers.

17. The gas turbine engine of claim 15 wherein the at least one three-dimensional woven layer includes at least two three-dimensional woven layers.

18. The gas turbine engine of claim 17 wherein at least one three-dimensional woven layer of the at least two three-dimensional woven layers comprises a three-dimensional braided layer.

* * * * *